(12) United States Patent
Sekimoto

(10) Patent No.: US 8,611,735 B2
(45) Date of Patent: Dec. 17, 2013

(54) CAMERA MODULE

(75) Inventor: Yoshihiro Sekimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/569,456

(22) Filed: Aug. 8, 2012

(65) Prior Publication Data

US 2013/0039640 A1    Feb. 14, 2013

(30) Foreign Application Priority Data

Aug. 12, 2011 (JP) ................. 2011-177216
Jan. 18, 2012 (JP) ................. 2012-008482
May 15, 2012 (JP) ................. 2012-111953

(51) Int. Cl.
*G03B 17/00* (2006.01)
*H04N 5/228* (2006.01)
*G02B 27/64* (2006.01)

(52) U.S. Cl.
USPC ................ 396/55; 348/208.99; 359/557

(58) Field of Classification Search
USPC ............ 396/55; 348/208.99; 359/554, 557
See application file for complete search history.

(56) References Cited

U.S. PATENT DOCUMENTS

| | | | | |
|---|---|---|---|---|
| 5,636,068 | A * | 6/1997 | Tanaka | 359/814 |
| 7,881,598 | B1 * | 2/2011 | Wu et al. | 396/55 |
| 2005/0128894 | A1 | 6/2005 | Won et al. | |
| 2007/0035860 | A1 | 2/2007 | Adachi et al. | |
| 2010/0157779 | A1 | 6/2010 | Ieki et al. | |
| 2012/0229926 | A1 * | 9/2012 | Wade et al. | 359/824 |

FOREIGN PATENT DOCUMENTS

| | | |
|---|---|---|
| JP | 2001-176100 | 6/2001 |
| JP | 2005-182977 | 7/2005 |
| JP | 2005-258355 | 9/2005 |
| JP | 2007-47494 | 2/2007 |
| JP | 2007-200461 | 8/2007 |
| JP | 2008-090023 | 4/2008 |
| JP | 2009-009027 | 1/2009 |
| JP | 2010-096859 | 4/2010 |
| JP | 2011-065140 | 3/2011 |
| JP | 2011-113009 | 6/2011 |

* cited by examiner

*Primary Examiner* — Clayton E Laballe
*Assistant Examiner* — Noam Reisner
(74) *Attorney, Agent, or Firm* — Edwards Wildman Palmer LLP; George W. Neuner

(57) ABSTRACT

A camera module (50) having a function of compensating for hand shake includes: suspension wires (16) for supporting an intermediate supporting member (13); AF springs (12a) for refraining stress to be applied to the suspension wires (16); and damper members (11) for causing a reduction in vibrations of the AF springs (12a).

21 Claims, 13 Drawing Sheets

CAMERA MODULE

This Nonprovisional application claims priority under 35 U.S.C. §119 on Patent Application No. 2011-177216, No. 2012-008482, and No. 2012-111953, filed in Japan on Aug. 12, 2011, Jan. 18, 2012, and May 15, 2012, respectively, the entire contents of which are hereby incorporated by reference.

TECHNICAL FIELD

The present invention relates to a camera module to be mounted on an electronic device such as a mobile phone, and, especially, to a camera module including a system for compensating for hand shake.

BACKGROUND ART

On the recent mobile phone market, types of mobile phones having built-in camera modules have been dominant. These camera modules are meant to be embedded in the mobile phones. Therefore, they face greater demands for being compact and lightweight, compared with camera modules to be embedded in digital cameras.

Also, there have been an increasing number of camera modules that (i) operate their autofocus (AF) systems with the use of lens drive devices and (ii) are mounted on electronic devices such as mobile phones. Examples of lens drive devices that have been developed so far encompass those employing stepper motors, piezoelectric sensors, and VCM (Voice Coil Motor). Such lens drive devices have already been distributed on the market.

Meanwhile, now that such camera modules having autofocus systems have become new standards, a system for compensating for hand shake is becoming the focus of attention as a next distinctive feature. Although a system for compensating for hand shake has been widely used for digital cameras and camcorders, there have been only a few mobile phones equipped with systems for compensating for hand shake, due to the issue of a limited size of mobile phone. Nevertheless, it is expected that mobile-phone-specified camera modules having systems for compensating for hand shake will be more widespread in years to come, and, in fact, a new system (configuration) for compensating for hand shake, which can be made compact, has been suggested.

Patent Literature 1 discloses, as a system for compensating for hand shake, a camera-shake correction device employing a "barrel shift" format. The camera-shake correction device disclosed in Patent Literature 1 is, in order to move a lens barrel in accordance with the optical axis, a camera-shake correction device that stabilizes an image by moving the entire auto-focusing lens drive device or its moving part in a first direction and a second direction which are perpendicular to the optical axis and are perpendicular to each other, the auto-focusing lens drive device being provided with a focusing coil and a permanent magnet which is disposed on the outside of the focusing coil. The camera-shake correction device includes: a base disposed to be spaced from the bottom surface of the auto-focusing lens drive device; a plurality of suspension wires which each have one end fixed to the outer peripheral section of the base, which extend along the optical axis, and which support the entire auto-focusing lens drive device or its moving part in such a manner that the auto-focusing lens drive device can rock in the first direction and the second direction; and a camera-shake correcting coil disposed to face the permanent magnet.

Also, Patent Literature 2 discloses a technology for increasing a shock resistance feature of a device for compensating for hand shake, which device employs a suspension wire similar to the one disclosed in Patent Literature 1. A lens drive device disclosed in Patent Literature 2 includes: a first supporting body that hold the lens and is capable of moving in the direction of the optical axis; a second supporting body that holds the first supporting body in a manner enabling movement in the direction of the optical axis; a fixed body that hold the second supporting body in a manner enabling movement in directions that are roughly perpendicular to the direction of the optical axis; a first drive mechanism for driving the first supporting body in the direction of the optical axis; a second drive mechanism for driving the second supporting body in a predetermined first direction that is roughly perpendicular to the direction of the optical axis; a third drive mechanism for driving the second supporting body in a second direction that is roughly perpendicular to the direction of the optical axis and to the first direction; a plurality of wires for connecting the second supporting body to the fixed body; and a buckling prevention member for preventing buckling of the wires. The wires are formed linearly; the second supporting body is supported by the fixed body by means of the wires in a manner enabling movement in directions that are roughly perpendicular to the direction of the optical axis; and the buckling prevention member is made of elastic material, and is elastically deformed in the direction of the optical axis by a force smaller than the buckling load of the wires.

CITATION LIST

Patent Literatures

Patent Literature 1
Japanese Patent Application Publication, Tokukai, No. 2011-65140 A (Publication Date: Mar. 31, 2011)
Patent Literature 2
Japanese Patent Application Publication, Tokukai, No. 2011-113009 A (Publication Date: Jun. 9, 2011)

SUMMARY OF INVENTION

Technical Problem

The technology disclosed in Patent Literature 1 disregards the drop impact: in a case where the camera-shake correction device receives considerable impact as a result of being dropped, the suspension wire might be (i) permanently flexed due to the force of pulling the suspension wire or (ii) buckled due to the force of compressing the suspension wire. This is because a long and thin metal suspension wire has significantly little tolerance to its expansion and contraction in a longitudinal direction despite being flexible to a direction perpendicular to the longitudinal direction.

The technology disclosed in Patent Literature 2 is designed in view of the drop-impact resistance. However, with the technology, there is a risk that a servo system might oscillate. In a case where (i) a drive force of compensating for hand shake is applied to a structure (e.g. the second supporting body of Patent Literature 2) supported by a suspension wire and (ii) the barycentric position of the structure and the position to which the drive force is applied are not aligned, the structure generates torque. Then, the torque triggers the oscillation of the suspension wire and of an elastic member (e.g. the buckling prevention member) connected to the suspension wire. An oscillation frequency is determined by the weight and the spring constant of a moving part. That is, in the case where the elastic member is connected to the suspension wire in order to prevent buckling of the suspension wire, (i) a resonant frequency associated with the rotation movement of the structure becomes lowered and therefore (ii) the risk of the oscillation of the servo system increases, depending on how large the peak value of the oscillation is.

The present invention has been made in view of the problems, and its primary object is to provide a technology which (i) is designed for a camera module having a mechanism for compensating for hand shake, which mechanism includes suspension wires connected to respective elastic members and (ii) ensures drop-impact resistance while reducing the risk of the oscillation of a servo system.

Solution to Problem

In order to attain the object, a camera module in accordance with the present invention is a camera module having a function of compensating for hand shake, including: a moving part including image capturing lenses; a fixed part surrounding the moving part; a driving means for moving the moving part in a direction perpendicular to a direction of an optical axis of the image capturing lenses; suspension wires, which extend parallel to or at an angle to the direction of the optical axis, for supporting the moving part such that the moving part is moved in the direction perpendicular to the optical axis; elastic members, connected to at least one ends of the respective suspension wires, each suppressing stress to be applied to a corresponding one of the suspension wires; and damper members, applied to the respective elastic members, which cause a reduction in vibrations of the elastic members.

According to the configuration, as described above, there is a possibility that, when the driving means servo drives the moving part for compensating for hand shake, a rotational moment is applied to the moving part so that the elastic members connected to the suspension wires resonate. In such a case, the resonance of the elastic members might adversely affect the servo driving for compensation for hand shake. However, with the configuration, the damper members are applied to the elastic members. This causes a reduction in the resonance of the elastic members. Therefore, with the configuration, it is possible to reduce the risk of the oscillation of the servo system while ensuring drop-impact resistance.

Advantageous Effects of Invention

A camera module in accordance with the present invention is a camera module having a function of compensating for hand shake, including: a moving part including image capturing lenses; a driving means for moving the moving part in a direction perpendicular to a direction of an optical axis of the image capturing lenses; suspension wires, which extend parallel to or at an angle to the direction of the optical axis, for supporting the moving part such that the moving part is moved in the direction perpendicular to the optical axis; elastic members, connected to at least one ends of the respective suspension wires, each suppressing stress to be applied to a corresponding one of the suspension wires; and damper members, applied to the respective elastic members, which cause a reduction in vibrations of the elastic members. Therefore, it is possible to reduce the risk of the oscillation of a servo system while ensuring drop-impact resistance.

DESCRIPTION OF EMBODIMENTS

Embodiment 1

Figure 1:
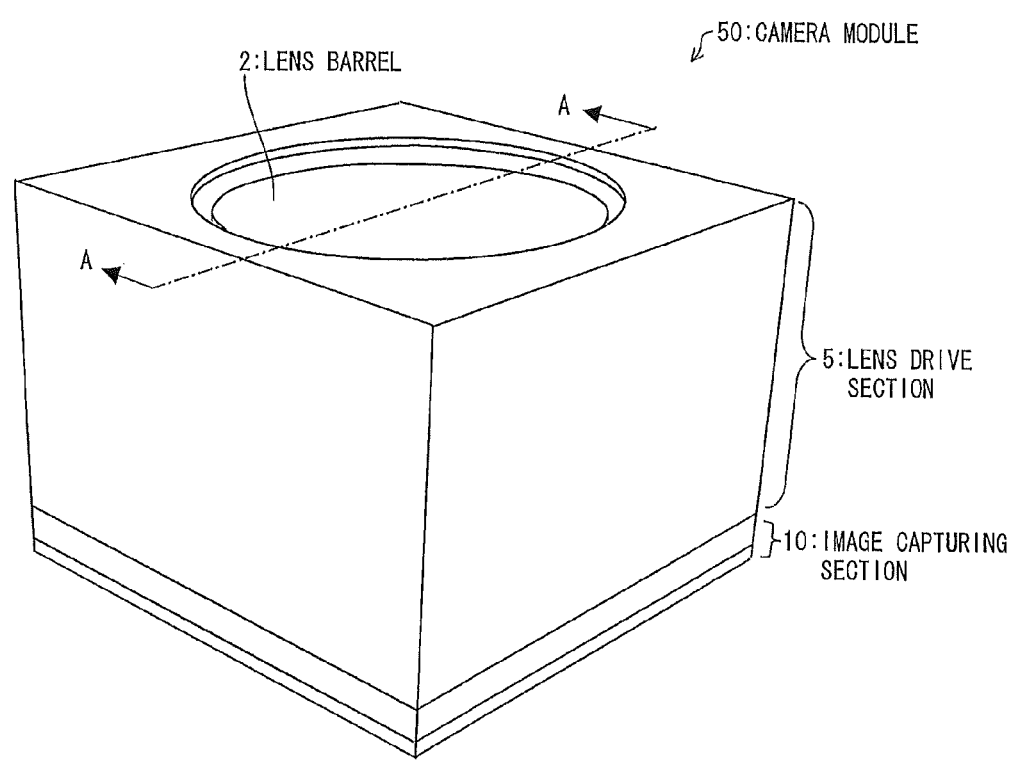
FIG. 1 is a perspective view schematically illustrating a configuration of a camera module in accordance with Embodiment 1 of the present invention.
Figure 2:
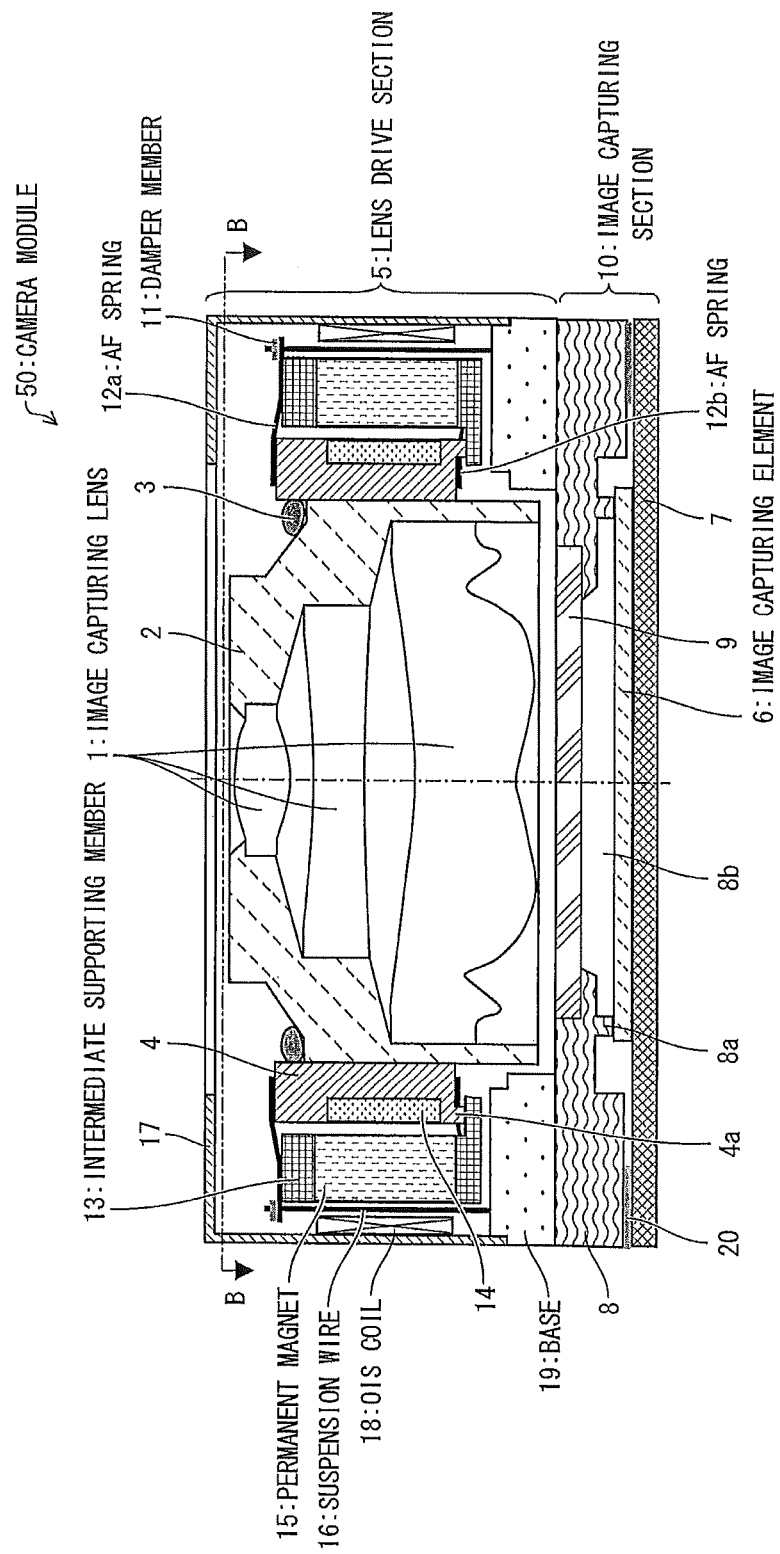
FIG. 2 is a cross-sectional view schematically illustrating the configuration of a camera module in accordance with Embodiment 1 of the present invention.
Figure 3:
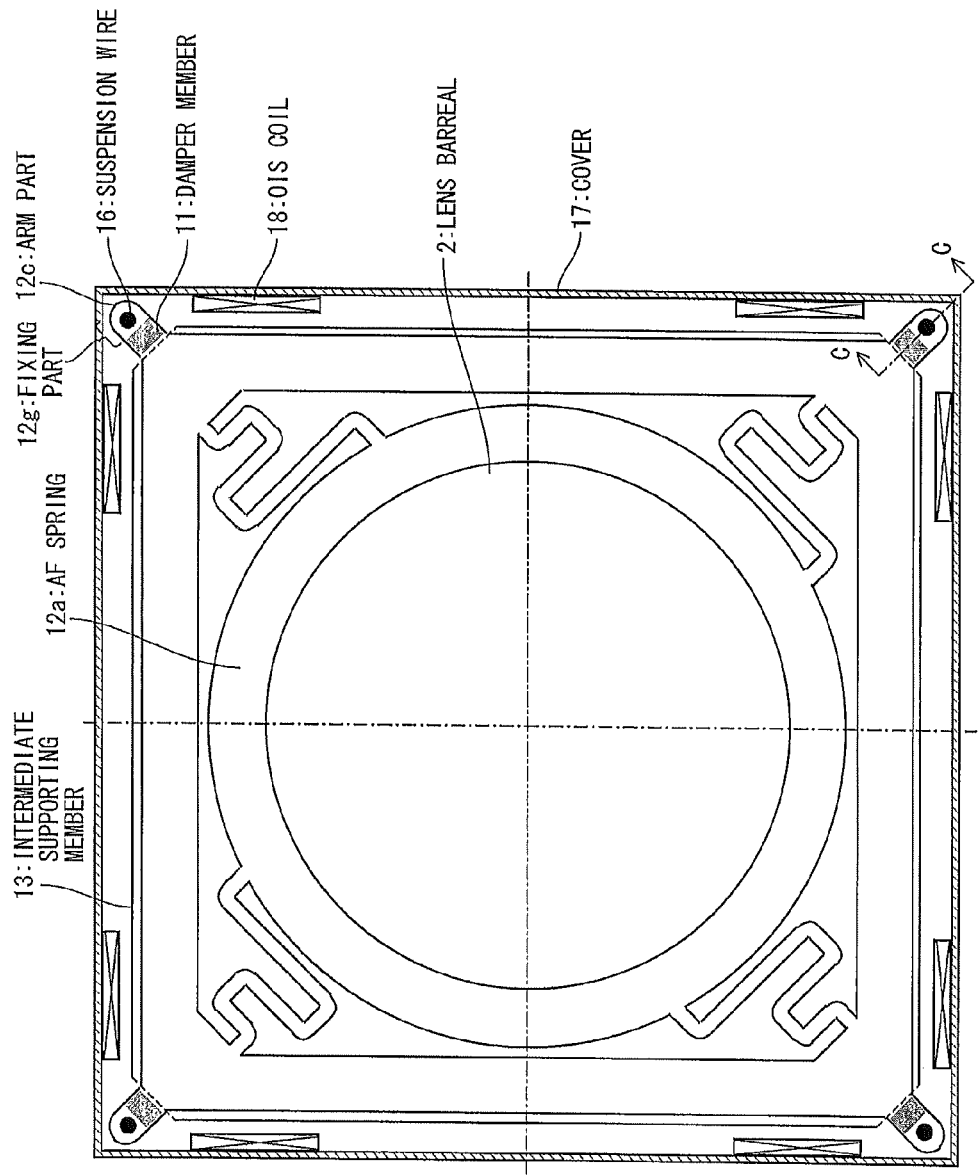
FIG. 3 is another cross-sectional view schematically illustrating the configuration of a camera module in accordance with Embodiment 1 of the present invention.

FIG. 1 is a perspective view schematically illustrating a configuration of a camera module 50 in accordance with Embodiment 1 of the present invention. FIG. 2 is a cross-sectional view taken along the line A-A of the camera module 50 illustrated in FIG. 1. FIG. 3 is a cross-sectional view taken along the line B-B of the camera module 50 illustrated in FIG. 2.

(Camera Module)

As illustrated in FIGS. 1 through 3, the camera module 50 includes (i) image capturing lenses 1, (ii) a lens barrel 2 accommodating the image capturing lenses 1, and (iii) a lens holder 4 fixing the lens barrel 2 in the camera module 50 with the use of an adhesive 3.

The camera module 50 further includes (i) a lens drive section 5 for moving the image capturing lenses 1 in a direction of an optical axis of the image capturing lenses 1 (hereinafter, referred to as the optical-axis direction) and in directions of two axes each perpendicular to the optical-axis direction and (ii) an image capturing section 10. The image capturing section 10 includes (a) an image capturing element 6 for carrying out a photoelectric conversion of light which has passed through the image capturing lenses 1, (b) a substrate 7 on which the image capturing element 6 is provided, (c) a sensor cover 8 covering the image capturing element 6, and (d) a glass substrate 9. The lens drive section 5 and the image capturing section 10 are stacked together in the optical-axis direction. The lens drive section 5 is covered with a cover 17.

Note that, for convenience, the following description will discuss a configuration in which a set of the image capturing lenses 1 is placed on top of the image capturing element 6. However, the arrangement of these members while in use is not limited to such a vertical order. They can therefore be placed vice versa, for example.

(Lens Drive Section)

The lens drive section 5 includes AF springs 12a and 12b, an intermediate supporting member 13, an AF coil 14, a permanent magnet 15, suspension wires 16, OIS coils 18, and a base 19.

The following is a description of the autofocus system: The lens holder 4 is supported by the two (upper and lower) AF springs (flat springs) 12a and 12b so as to be moved in the optical-axis direction with respect to the intermediate supporting member 13. The AF coil 14 is fixed on the periphery of the lens holder 4. The permanent magnet 15, which serves both as a permanent magnet for autofocus and as a permanent magnet for compensating for hand shake, is fixed to the intermediate supporting member 13 (supporting member). Alternatively, however, it is possible to provide two separate permanent magnets. A protruding part 4a of the lens holder 4 is in contact with the intermediate supporting member 13 at a mechanical end on an infinite distance side of the lens holder 4's moving range in the optical-axis direction (i.e. at a reference position, in a moving range, on an image-capturing-lens-element-6 side). It is then possible to move, by controlling the AF coil 4, the lens holder 4 (and the image capturing lenses 1) in the optical-axis direction. This is how the autofocus system is achieved.

Next, the following is a description of the compensation for hand shake: The intermediate supporting member 13 is supported by four suspension wires 16 so as to be moved, with respect to the base 19, in the directions of two axes each perpendicular to the optical-axis direction. Each suspension wire 16 is, for example, a long and thin metal wire extending in a direction parallel to the optical axis. Note that the longitudinal direction of each of the four suspension wires 16 does not need to be consistent with the optical-axis direction, and can therefore be divergent from the optical-axis direction by tilting the four suspension wires 16 inwards by a small amount. In short, the suspension wires 16 can be provided so as to have their longitudinal directions at an angle to the optical-axis direction. The OIS coils 18 are fixed inside the cover 17. It is then possible, by controlling the OIS coils 18, to integrally move in the directions perpendicular to the optical-axis direction, (i) the intermediate supporting member 13, (ii) the permanent magnet 15, (iii) the AF springs 12a and 12b, (iv) the lens holder 4, (v) the AF coil 14, (vi) lens barrel 2, (vii) the image capturing lenses 1, and (viii) the like. This is how the compensation for hand shake is achieved.

Hereinafter, parts of the camera module 50 that are moved in the direction perpendicular to the optical-axis direction are referred to as an OIS moving part (moving part), and the rest of the camera module 50 is referred to as an OIS fixed part (fixed part). Specifically, the OIS moving part includes the image capturing lenses 1, the lens barrel 2, the lens holder 4, the AF springs 12a and 12b, the intermediate supporting member 13, the AF coil 14, and the permanent magnet 15. The OIS fixed part includes the cover 17, the OIS coils 18, and the base 19.

(Arrangement of Image Capturing Lens Etc.)

In Embodiment 1, the lens barrel 2, while being incorporated in the camera module 50, partially reaches inside of an opening of the base 19. Such an arrangement is commonly employed because it is difficult to secure a sufficiently large flange back of the image capturing lenses 1 (a distance between a bottom surface of the lens barrel 2 and a top surface of the image capturing element 6). The lens drive section 5 is mounted on the sensor cover 8.

The sensor cover 8 (i) has a protruding section 8a whose end part is provided so that its reference surface is in contact with the image capturing element 6 and (ii) is placed so as to cover the entire image capturing element 6. The sensor cover 8 has an opening 8b on an-image-capturing-lenses-1 side, and the opening 8b is bunged up by the glass substrate 9 having a function to block infrared rays. The image capturing element 6 is mounted on the substrate 7. The substrate 7 and the sensor cover 8 are firmly fixed to each other while a gap, which is created by the tolerance between the substrate 7 and the sensor cover 8, is filled with an adhesive 20.

The lens barrel 2 and the lens holder 4 are fixed to each other with the use of an adhesive such that the lens barrel 2 is located as predetermined while the lens holder 4 is located at the mechanical end on the infinite-distance side of the lens holder 4's moving range in the optical-axis direction. The lens barrel 2 and the sensor cover 8 are provided so as to have, therebetween, a gap of, for example, approximately 10 μm. In order to locate the lens barrel 2 while securing the gap of approximately 10 μm, a jig can be employed to adhere the sensor cover 8 to the lens barrel 2 while the lens barrel 2 is being held.

The following description will discuss a location at which the lens barrel 2 is attached to the lens holder 4. It is desirable that the image capturing lenses 1 are provided at such a distance away from the image capturing element 6 that a focal point of the lenses is located at the mechanical end on the infinite-distance side. However, there is a concern that an error might remain in a case where the image capturing lenses 1 are mechanically located without focus adjustment. This is because there exist (i) the tolerance in the location at which the lens barrel 2 is attached to the image capturing lenses 1, (ii) the tolerance in the thickness of the sensor cover 8, and (iii) the unevenness of the members.

Therefore, in order for the lens drive section 5 to have a focal point within a stroke of the lens drive section 5, it is preferable that the image capturing lenses 1 are provided so as to be slightly shifted, from a designed center location of the focal point, closer to the image capturing element 6 even if the error remains. Such a slight shift is called "over infinity." In a case where the over infinity is set to be large, the stroke of the lens drive section 5 becomes large accordingly. Therefore, the over infinity needs to be kept to a minimum. According to cumulative total of the various tolerances above, for example, 25 μm is appropriate as the over infinity. Note, however, that since this over infinity is susceptible to the tolerances for manufacturing and assembling of the members, it is desirable that the over infinity is set to a realistic minimum one.

In Embodiment 1, (i) the reference surface (on the bottom part) of the sensor cover 8 is directly pressed against the image capturing element 6, (ii) the sensor cover 8, in which thickness accuracy is improved, is employed, and (iii) the lens barrel 2 is precisely located with respect to a top surface of the sensor cover 8 (i.e. with respect to a bottom surface of the lens drive section 5). Therefore, it can be said that, in Embodiment 1, the over infinity of approximately 25 μm is sufficiently large without causing malfunction. In Embodiment 1, (a) the lens barrel 2 is provided so as to be shifted closer, by merely 25 μm, to the image capturing element 6 from a location where an object at infinity is to be focused and (b) there exists a gap between the sensor cover 8 and the lens barrel 2.

(Elasticity and Damper Member)

As illustrated in FIG. 3, a characteristic arrangement of the camera module 50 in Embodiment 1 resides in that (i) the AF spring 12a (top) has parts protruding (extending) from the periphery of the intermediate supporting member 13, each of which parts serves as a flexible arm part 12c (extending part), (ii) top end parts of respective suspension wires 16 are fixed to substantially end parts of the respective arm parts 12c, and (iii) damper members 11 are provided on parts of the respective arm parts 12c. The suspension wires 16 are fixed to the arm parts 12c via fixing parts 12g of the respective arm parts 12c.

The arm parts 12c each function as an elastic member for suppressing stress applied to a corresponding one of the suspension wires 16. The arm parts 12c are preferably arranged to suppress buckling and permanent strain of the respective suspension wires 16. Examples of a material for the arm parts 12c encompass, but not limited to, metal and plastic. The arm parts 12c can be more preferably made from a material which can sufficiently reduce the spring constant of the suspension wire 16 and can be kept free of a plastic deformation even when subjected to a deformation of about 150 μm. In a case where the arm parts 12c and the suspension wires 16 are soldered, it is preferable that the arm parts 12c are each made of metal.

The deforming amount of each arm parts 12 during normal use is negligible. However, in a case where the camera module 50 receives an excessive impact due to dropping on the floor etc., the force of inertia is applied, in the optical-axis direction, to the OIS moving part including the intermediate supporting member 13. Then, the base 19, provided on a bottom part of the intermediate supporting member 13, functions as a stopper (locking member) that controls the range in which the intermediate supporting member 13 (OIS moving part) can be moved in the optical-axis direction. It is therefore possible to control the displacement of the intermediate supporting member 13 in the optical-axis direction. Nevertheless, in order to prevent the OIS moving part from coming into contact with the OIS fixed part, it is crucial to secure a space of approximately 100 μm to 150 μm between the OIS moving part and the OIS fixed part, by taking into consideration the assembling errors etc. Hence, there is a possibility that such a space will vary by approximately 150 μm. If an attempt is made to compensate for the deformed amount of the space merely by use of the expansion and contraction of the suspension wires, then there is a possibility that each of the suspension wires 16 will receive stress that is beyond its buckling stress or yield stress.

In this regard, according to Embodiment 1, the arm parts 12c are configured to bear part of the deforming amount of the space between the OIS moving part and the OIS fixed part. This makes it possible to suppress the deforming amount, in the longitudinal direction, of the suspension wires 16. It is therefore possible to sufficiently refrain the buckling and permanent strain of the suspension wires 16.

In order to suitably refrain the stress to be applied to the suspension wires 16, deformed amounts of the arm parts 12c need to be increased. Specifically, it is necessary to configure the arm parts 12c to have a spring constant less than that of each suspension wire 16 in the longitudinal direction. This causes a reduction in resonant frequency of the arm parts 12c. As such, (i) a resonance is generated in a servo frequency range of the arm parts 12c and (ii) the servo system is then adversely affected.

In this regard, according to Embodiment 1, the arm parts 12c are provided with the damper members 11. This allows the vibrations of the arm parts 12c to be damped. It is therefore possible to reduce the risk of the oscillation of the servo system.

It is possible to attach, to each arm parts 12c, a sheet-like rubber material as a damper member 11. Note, however, that ultraviolet-curing gel (i) is more workable and (ii) does not have a large spring constant as a result of being cured. Therefore, ultraviolet-curing gel is more suitable for attaining the object of the present invention. Examples of ultraviolet-curing gel encompass, but not limited to, TB3168 and TB3169, both of which are manufactured by ThreeBond Co., Ltd.

Figure 4:
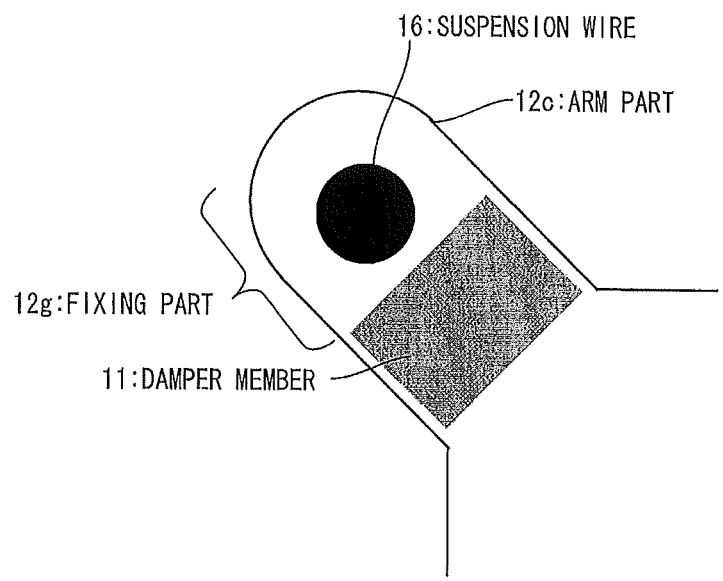
FIG. 4 is a view schematically illustrating an example of a configuration of an elastic member/damper member in Embodiment 1 of the present invention.

FIG. 4 is an enlarged plan view illustrating an area around an arm part 12c. As illustrated in FIG. 4, a damper member 11 is attached to substantially the entire flexible part of the arm part 12c. This makes it possible to sufficiently damp vibrations of the arm part 12c.

Figure 5:
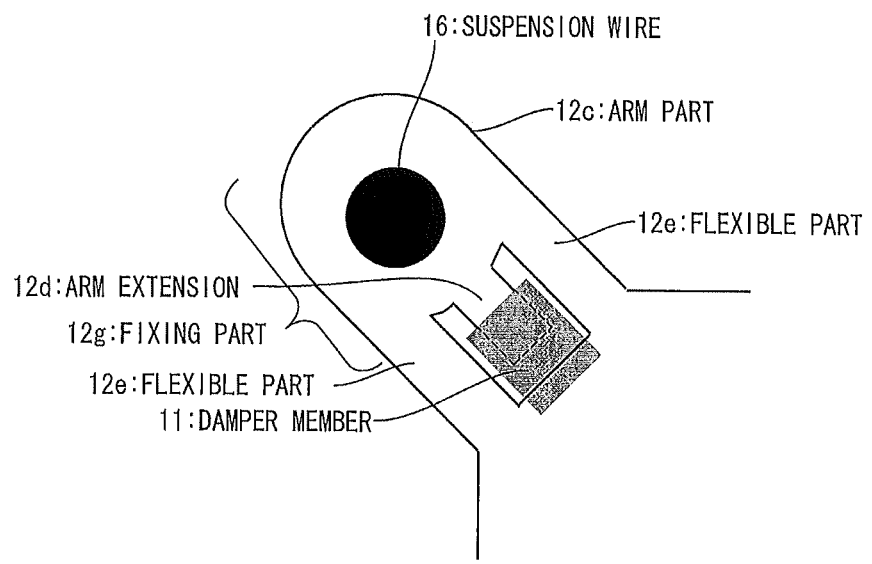
FIG. 5 is a view schematically illustrating another example of the configuration of the elastic member/damper member in Embodiment 1 of the present invention.

FIG. 5 illustrates a modification of how an arm part 12c is configured and how a damper member 11 is attached to the arm part 12c. In the modification, (i) the arm part 12c has an arm extension 12d extending inwards from an end-part side (a wire-fixing-part-12g side to which the suspension wire 16 is attached) of the arm part 12c and (ii) the damper member 11 is provided to serve as a bridge between the arm extension 12d and the intermediate supporting member 13. Note that the phrase "serve as a bridge" herein means that in a first region and a second region apart from each other by a certain distance, the first and second regions are to be connected with each other. Part of the damper member 11 can cover a flexible part 12e (flexing part) of the arm parts 12c. This eliminates the necessity that the damper member is applied onto the entire arm parts 12c. Since the displacement rate of the arm extension 12d which will carry out a motion equivalent to that of the wire fixing part 12g is suppressed, it is possible to obtain an equivalent effect, with a little amount of the damper member 11, of reducing the flexure of the arm parts 12c to when a greater amount of the damper member 11 is applied to the entire portion of the arm parts 12c.

Figure 6:
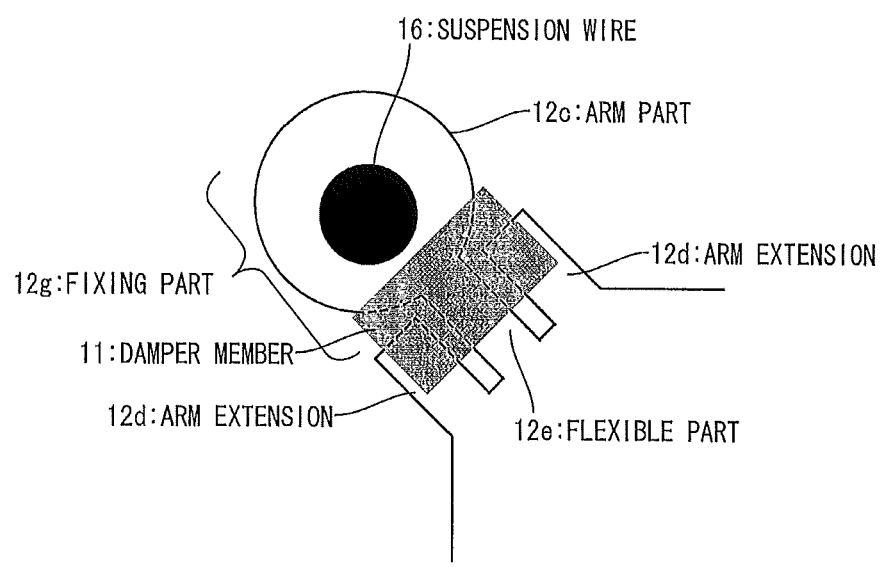
FIG. 6 is a view schematically illustrating a further example of the configuration of the elastic member/damper member in Embodiment 1 of the present invention.

FIG. 6 illustrates another modification of how an arm part 12c is configured and how a damper member 11 is attached to the arm part 12c. In the modification, arm extensions 12d extend from intermediate-supporting-member-13 sides of arm parts 12c. The damper member 11 is provided to serve as a bridge between an end part of the arm parts 12c and the respective arm extensions 12d. Note, however, that part of the damper member 11 can cover a flexible part 12e of the arm parts 12c. With this configuration, it is possible to obtain an effect similar to the other configurations.

According to each of the configurations illustrated in FIGS. 5 and 6, the damper member 11 is thus provided to serve as a bridge between (i) the fixing part 12g and (ii) the other part of the arm part 12c which is a part having a smaller amount of displacement, occurred during vibrations of the arm part 12c, in the optical-axis direction than the fixing part 12g does. This causes a reduction in the difference in the displacement rate between the fixing part 12g and the other part of the arm parts 12c. It is therefore possible to suitably suppress the vibrations of the arm parts 12c.

As another alternative, the damper member 11 can be provided to serve as a bridge between the fixing part 12g and the intermediate supporting member 13. The intermediate supporting member 13 is hardly displaced in the optical-axis direction during the vibrations of the arm parts 12c. Therefore, the use of the damper member 11 as a bridge between the fixing part 12g and the intermediate supporting member 13 causes a reduction in the difference in the displacement rate between the fixing part 12g and the other part of the arm parts 12c. It is therefore possible to suitably suppress the vibrations of the arm parts 12c.

(Spring Constant)

Figure 8:
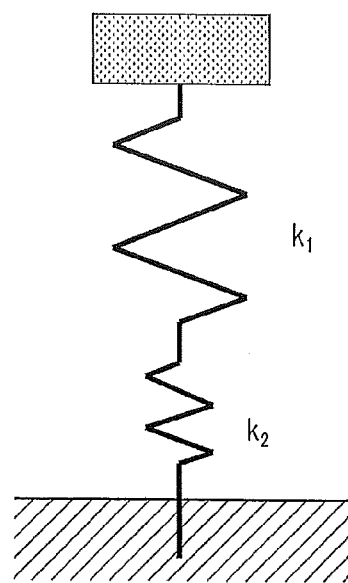
FIG. 8 is a view illustrating that a suspension wire is connected to the elastic material.

The following description will discuss, in more detail, a solution to the dropping of the camera module 50 in accordance with Embodiment 1. A relationship between the spring constant of the suspension wire 16 and the spring constant of the arm part 12c (elastic member) is illustrated in FIG. 8. FIG. 8 is a plan view schematically illustrating how the arm part 12c and the suspension wire 16 are connected in the longitudinal direction. As is illustrated in FIG. 8, the arm part 12c of the top AF spring 12a and the suspension wire 16 are cascade-connected springs. The arm part 12c has a spring constant k 1. The suspension wire 16 has a spring constant k 2 in the longitudinal direction. For convenience, the following description will merely discuss one of the suspension wires 16 and its corresponding arm part 12c.

The spring constants $k_1$ and $k_2$ are set so that $k_1 \ll k_2$ is met. The springs have deforming amounts which are inversely proportional to their respective spring constants, and can be obtained by the following respective expressions (1) and (2):

$$A \text{ deforming amount } \delta_1 \text{ of the arm part } 12c \text{ (elastic member)} = \delta k_2/(k_1+k_2) \quad (1)$$

$$A \text{ deforming amount } \delta_2 \text{ of the suspension wire } 16 = \delta k_1/(k_1+k_2) \quad (2)$$

where a total amount of a deformation caused by the drop impact is δ (e.g. the space of approximately 150 μm between the intermediate supporting member 13 and the base 19).

The force, F, required to deform the suspension wire 16 by merely $\delta_2$ can be obtained by the following expression (3):

$$F = \delta k_1 k_2/(k_1+k_2) \quad (3)$$

Therefore, the stress, σ, which varies depending on a deforming amount of the suspension wire 16 in the longitudinal-direction, can be obtained by the following equality (4):

$$\sigma = (\delta/A) k_1 k_2/(k_1+k_2) \quad (4)$$

where A indicates the area of a cross section of the suspension wire 16.

It is essential that σ do not exceed $\sigma_e$, which is the buckling stress of the suspension wire 16. This is because a yield stress is normally less than a buckling stress. Note that $k_1$ is to be calculated on the assumption that the damper member 11 has been applied to the arm part 12c (elastic member).

That is, the spring constant $k_1$ of the arm part 12c (elastic member) and the longitudinal-direction spring constant $k_2$ of the suspension wire 16 are preferably set to meet the following expression (5):

$$\sigma_e > (\delta/A) k_1 k_2/(k_1+k_2) \quad (5)$$

Normally, the Euler's buckling stress is used as an indication of a buckling stress. The Euler's buckling stress can be indicated by the following expression (6):

$$\sigma_e = C\pi^2 E/\lambda^2 \quad (6)$$

where C is a constant; E is the Young's modulus; and A is a slenderness ratio. The value of C is 4 in a case where a both-end-fixed beam is used.

Note that the Euler's buckling stress was calculated based on one of the design examples, and was approximately $1 \times 10^8 \text{N/m}^2$. Note, however, that the Euler's buckling stress is the one obtained in a case where ideal vertical load is applied. Also note that the load can be applied in an oblique direction. Thus, the buckling stress is preferably set with some margin. Therefore, it is desirable that $k_1$ and $k_2$ are set so that σ does not exceed the buckling stress thus calculated.

(Resonance)

The following description will discuss, in more detail, a solution to the oscillation of the servo system in the camera module 50.

Figure 7:
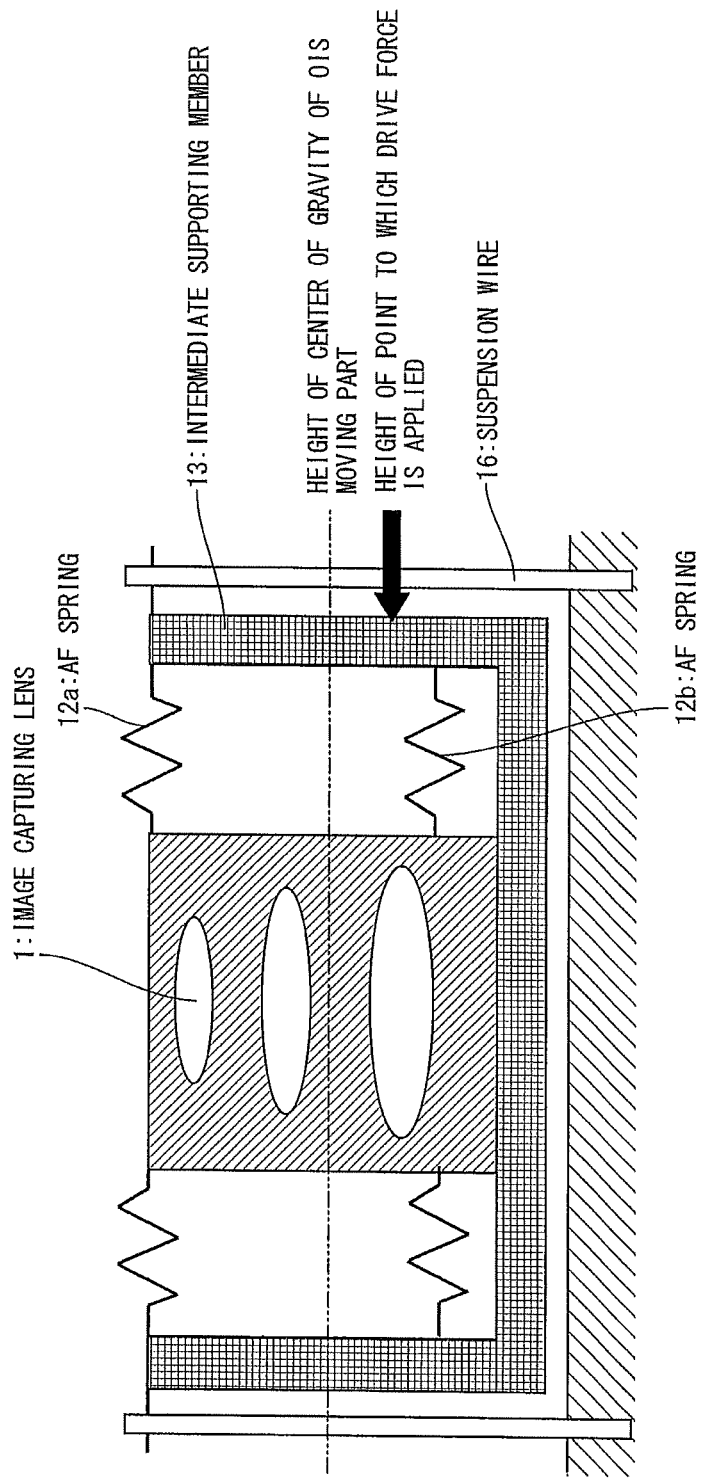
FIG. 7 is a view illustrating servo driving, for compensating for hand shake, of the camera module in accordance with Embodiment 1 of the present invention.

FIG. 7 schematically illustrates only essential members of the present invention. The lens holder 4 supporting the image capturing lenses 1 is supported by the upper and lower AF springs 12a and 12b. Part of each top AF spring 12a (i.e. arm part 12c) protrudes out of the intermediate supporting member 13, and the suspension wire 16 is fixed to the protruding arm part 12c. In a case where, in such a configuration, there is a displacement of (i) a height of center of gravity of the OIS moving part and (ii) a position where a servo-driving force (OIS driving force) for compensating for hand shake applied in a direction perpendicular to the optical-axis direction, the OIS moving part receives a rotational moment. This causes a resonance to be generated at a resonant frequency which is determined in accordance with a moment of inertia and the spring constants.

Figure 9:
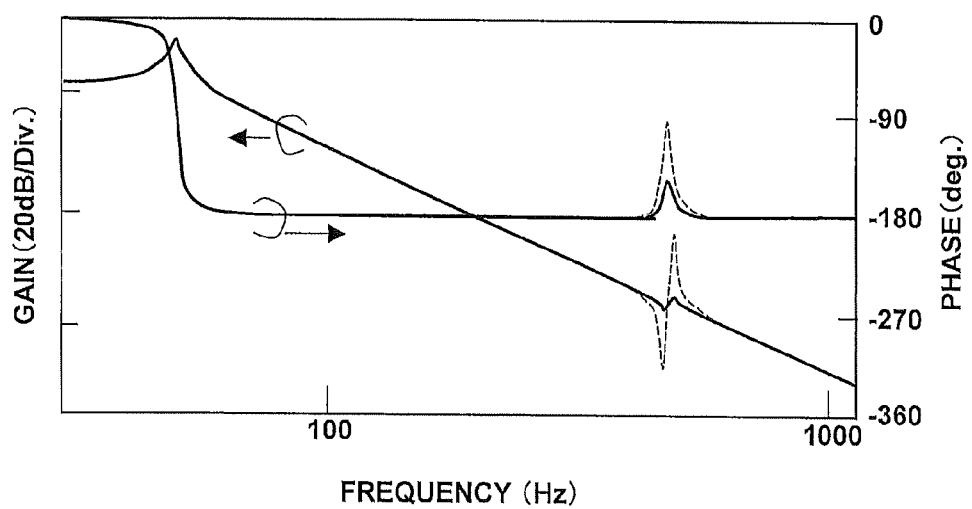
FIG. 9 is a bode plot illustrating the frequency response of the force applied in a direction of hand-shake compensation during the servo driving for the hand-shake compensation.

FIG. 9 is an example Bode plot illustrating a gain and a phase of the displacement of the OIS moving part with respect to an OIS driving force. A resonance peak observed at a frequency of approximately 600 Hz indicates a resonance in a rotational mode, which resonance is caused by the "arm" structure of the wire fixing parts (12g). Broken lines indicate characteristics in a case where no damper member 11 is applied to the arm part 12c (elastic member), part of which characteristic is a remarkably large resonance peak. Note that a cutoff frequency of a servo system for compensating for hand shake is typically set to about 100 Hz to 200 Hz. Thus, the frequency of approximately 600 Hz, at which the resonance occurs, is higher than the cutoff frequency. The phase of the servo system is delayed at a frequency of approximately 600 Hz by substantially 180 degrees or more. In a case where there exists a large resonance peak in this frequency range, an insufficient gain margin is caused, and therefore the servo system is at risk of oscillation. The solid lines in FIG. 9 indicate characteristics obtained in a case where the damper member 11 is applied to the arm part 12c. As is clear from FIG. 9, since the resonance peak is well suppressed, a gain margin can be secured in the frequency range. This allows a more stable servo system to be achieved.

Embodiment 2

According to Embodiment 1, an arm part 12c, via which a suspension wire 16 and an OIS moving part are connected, functions as an elastic member for suppressing stress to be applied to the suspension wire 16. The present invention is, however, not limited to such. For example, it is possible to cause a connecting part, via which a suspension wire 16 and an OIS fixed part are connected, to function as an elastic member for suppressing stress to be applied to the suspension wire 16. The following description will discuss such a configuration as Embodiment 2 of the present invention.

Figure 10:
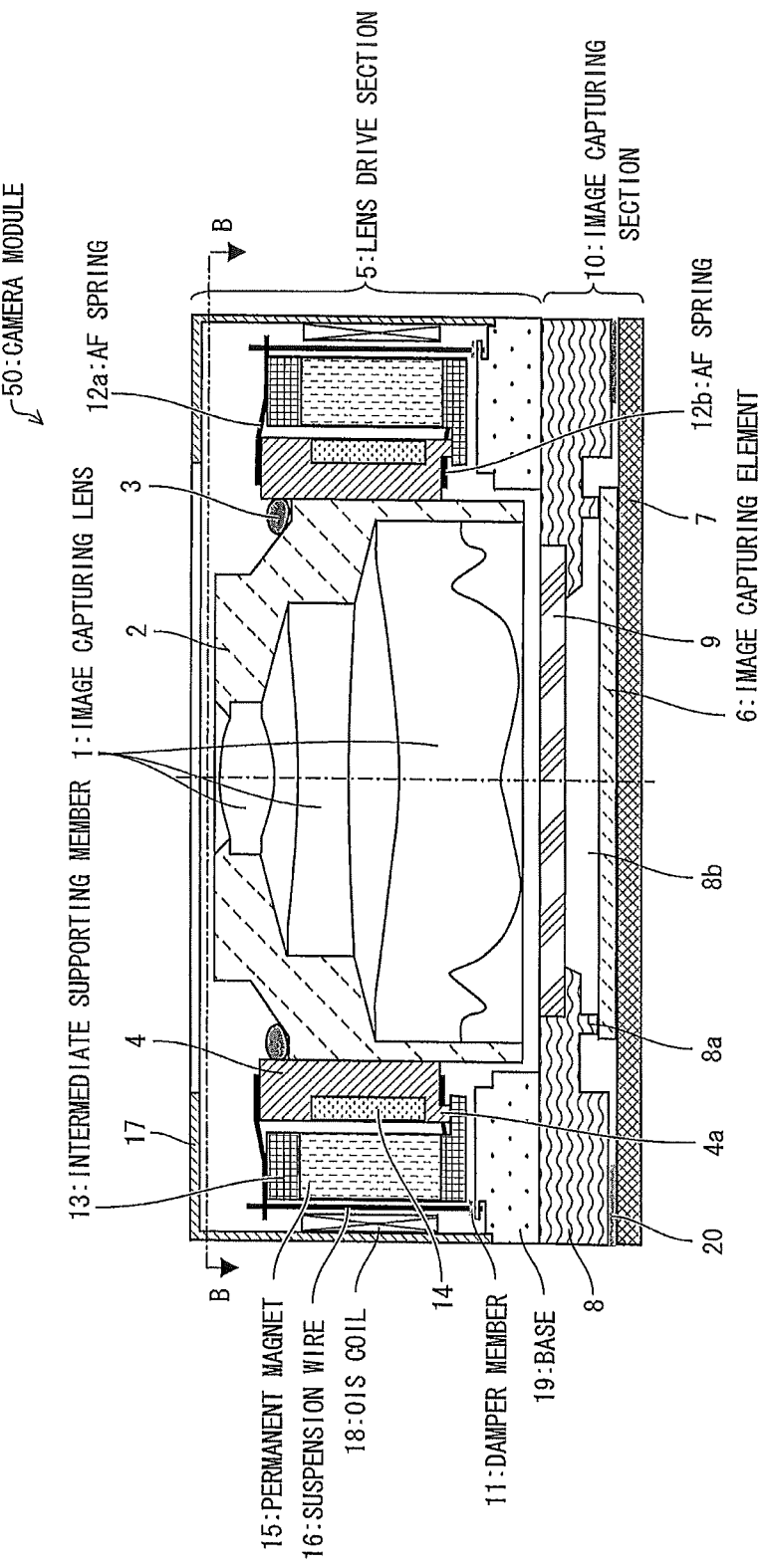
FIG. 10 is a cross-sectional view illustrating a configuration of a camera module in accordance with Embodiment 2 of the present invention.
Figure 11:
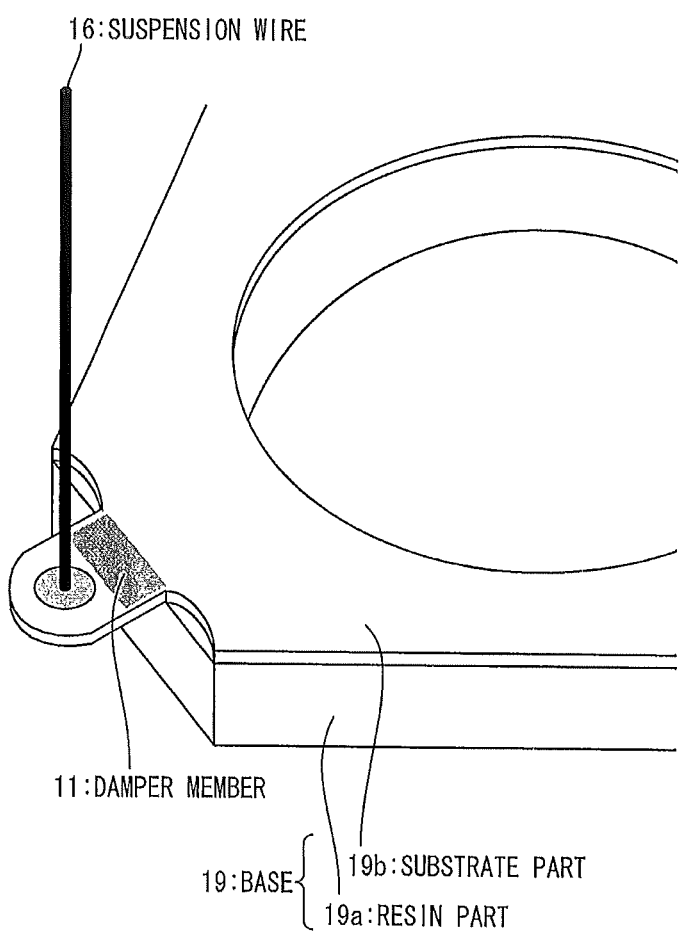
FIG. 11 is a view schematically illustrating a configuration of an elastic member/damper member in Embodiment 2 of the present invention.

FIG. 10 is a cross-sectional view schematically illustrating a configuration of a camera module 50 in accordance with Embodiment 2. FIG. 11 is an enlarged view illustrating a configuration, in the camera module 50, of an area around one of connecting parts of a suspension wire 16 and an OIS fixed part. Note that, in Embodiment 2, members whose functions are the same as those of Embodiment 1 are given the respective same reference numerals/signs, and their description will be omitted.

According to Embodiment 2, a base 19 has a double-layered configuration in which a substrate part 19b is supported by a resin part 19a (see FIGS. 10 and 11). Note, however, that part (hereinafter, referred to as flexible part) of the substrate part 19b can be flexible by causing the part not to be supported by the resin part 19a. Then, by fixing the suspension wires 16 to the flexible part of the substrate part 19b, the flexible part can function as an elastic member for suppressing the stress to be applied to the suspension wire 16.

Like the material for the arm part 12c, examples of a material for such a substrate part 19b arm parts encompass, but not limited to, metal and plastic. The substrate part 19b can be more preferably made from a material which can sufficiently reduce the spring constant of the suspension wire 16 and can be kept free of a plastic deformation even when subjected to a deformation of about 150 µm. In a case where the substrate part 19b and the suspension wires 16 are soldered, it is preferable that the substrate part 19b are each made of metal. It is also possible to use, as the substrate part 19b, a metal-patterned circuit board (glass epoxy board etc.).

Note that, as in Embodiment 1, the risk of the oscillation of a servo system can be reduced by applying damper members 11 to elastic members (the flexible parts of the substrate part 19b in Embodiment 2) for suppressing stress to be applied to the suspension wires 16.

As illustrated in FIG. 11, each damper member 11 can be provided so as to cover at least part of the flexible part of the substrate part 19b. As to how the flexible part of the substrate part 19b is to be configured and how the damper member 11 is to be applied, it is possible to take various forms, such as configurations similar to the ones illustrated in FIGS. 4 through 6. Specifically, a flexible part can be arranged such that (i) an arm extension protrudes out toward a main body of the substrate part 19b from a part of the flexible part in which part the suspension wire 16 is fixed and (ii) the damper member 11 is provided to serve as a bridge between an arm extension and the main body of the substrate part 19b. Alternatively, a flexible part can be arranged such that (a) an arm extension protrudes out from a main body of a substrate part 19b toward a part of the flexible part in which part the suspension wire 16 is fixed and (b) a damper member 11 is provided to serve as a bridge between an arm extension and the main body of the substrate part 19b.

Note that, in Embodiment 2, damper materials 11 are applied to the connecting parts, via which the suspension wires 16 and the OIS fixed part are connected, so that the connecting parts function as elastic member. However, it is possible, as in Embodiment 1, to (i) apply damper members 11 to connecting parts, via which the suspension wires 16 and the OIS moving part are connected, and (ii) cause such connecting parts to function as elastic members.

Embodiment 3

Figure 12:
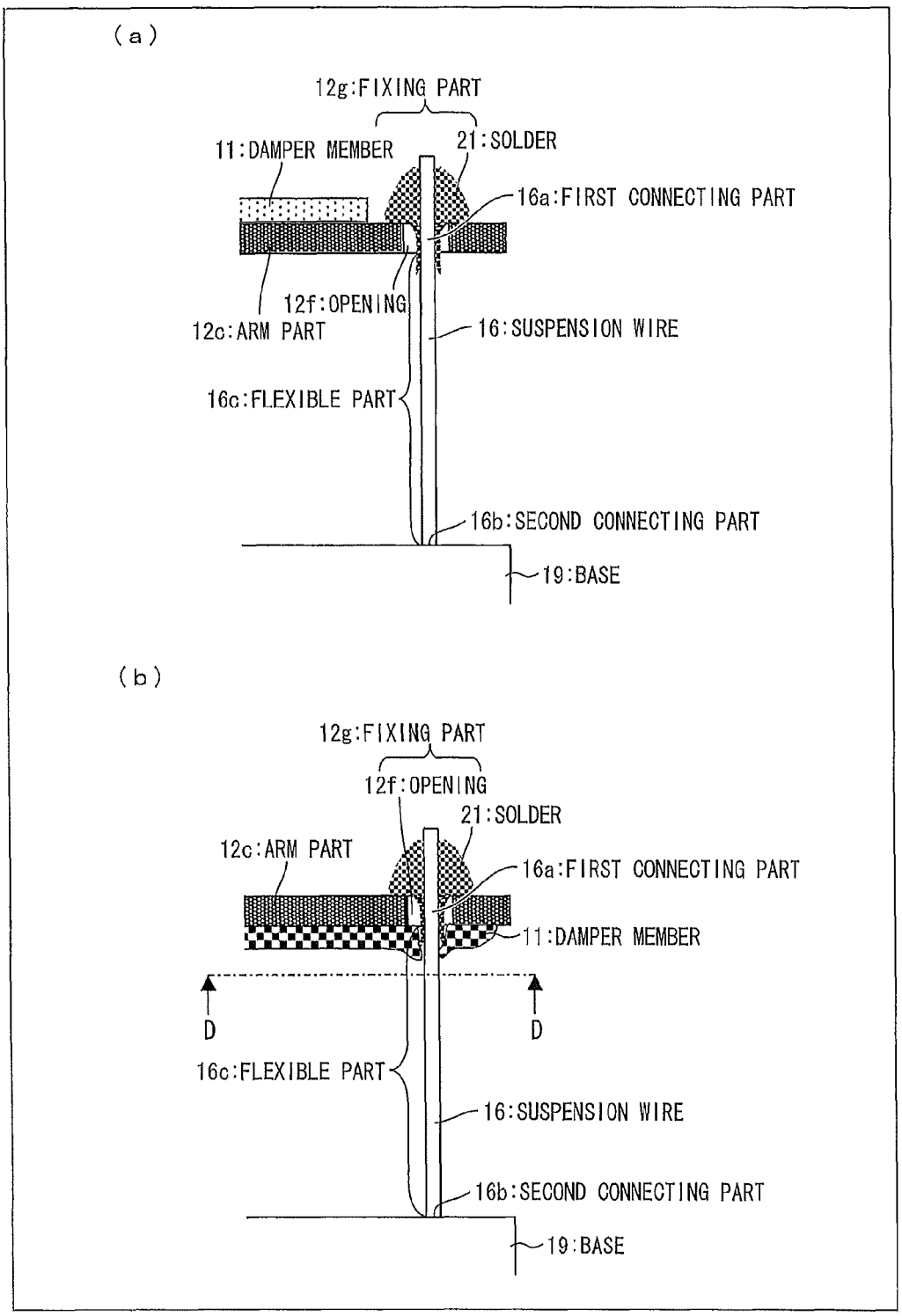
FIG. 12 is a view illustrating modifications of how the damper member is provided according to Embodiment 3 of the present invention.

The following description will discuss how to better provide a damper member 11, while contrasting between an example configuration A illustrated in (a) of FIG. 12 and an example configuration B illustrated in (b) of FIG. 12. Both of (a) and (b) of FIG. 12 are cross-sectional views each taken along the line C-C drawn in FIG. 3. Hereinafter, (i) a part of a suspension wire 16, which part is connected to an arm part 12c, is referred to as a moving-part-side fixed end or as a first connecting part 16a, (ii) a part of the suspension wire 16, which part is connected to a base 19 is referred to as a fixed-part-side fixed end or as a second connecting part 16b, and (iii) a part of the suspension wire 16 between the first connecting part 16a and the second connecting part 16b is referred to as a flexible part 16c. The flexible part 16c bends in response to a movement of an OIS moving part.

In both the example configurations A and B, the suspension wire 16 (i) goes through an opening 12f of the arm part 12c of an AF spring 12a and (ii) is fixed, with the use of a solder 21, to the arm part 12c so as to be electrically connected to the arm part 12c (see FIG. 12). By thus fixing the suspension wire 16 to the arm part 12c with the use of the solder 21, the respective suspension wires 16 and the respective arm parts 12c can be firmly connected to each other.

In the example configuration A, a damper member 11 is provided on a top surface of the arm part 12c, but is not particularly in contact with the suspension wire 16. The suspension wire 16 is soldered to a top-surface side (on an opposite side of a side facing the flexible part 16c) of the arm part 12c. Note, however, that the solder 21 does not necessarily remain only on the top-surface side. Specifically, the solder 21 can sometimes flow, via the opening 12f, into the bottom-surface side (the side facing the flexible part 16c) so as to be adhered to a surface of the flexible part 16c of the suspension wire 16. Note that, if the solder is adhered to the surface of the suspension wire 16, then elasticity of the suspension wire 16 is reduced. Especially, if the solder is adhered to a surface of the flexible part 16c, then the flexibility of the suspension wire 16 is adversely affected. Thus, in a case where the suspension wire 16 repeatedly receives stress, the suspension wire 16 is more likely to be subjected to a brittle fracture.

On the other hand, according to the example configuration B, the damper member 11 is provided on the bottom-surface side of the arm parts 12c. In other words, the damper member 11 is provided, on a surface of the arm part 12c, between the first connecting part 16a (moving-part-side fixed end) and the second connecting part 16b (fixed-part-side fixed end). Additionally, the damper member 11 is provided so as to cover part of the flexible part 16c of the suspension wire 16. Specifically, the damper member 11 is provided so as to cover at least part of a circumference of an end part of the flexible part 16c, which end part is on an arm-part-12c side. With the configuration, the damper member 11 suppresses vibrations of a root part of the flexible part 16c, which root part is most likely to be subjected to a brittle fracture. This causes alleviation of the stress to be applied to the root part. It is therefore possible to prevent its breakdown even when the stress is repeatedly applied to the suspension wires 16.

Note that, in the case where the damper member 11 is provided as in the example configuration B, a sheet material can be employed as the damper member 11 and is attached to the arm part 12c. Embodiment 3 is, however, not limited to this. For example, a damper member 11 can be provided in a desired location with ease, by applying a gel material to an arm part 12c and then curing the gel material.

Figure 13:
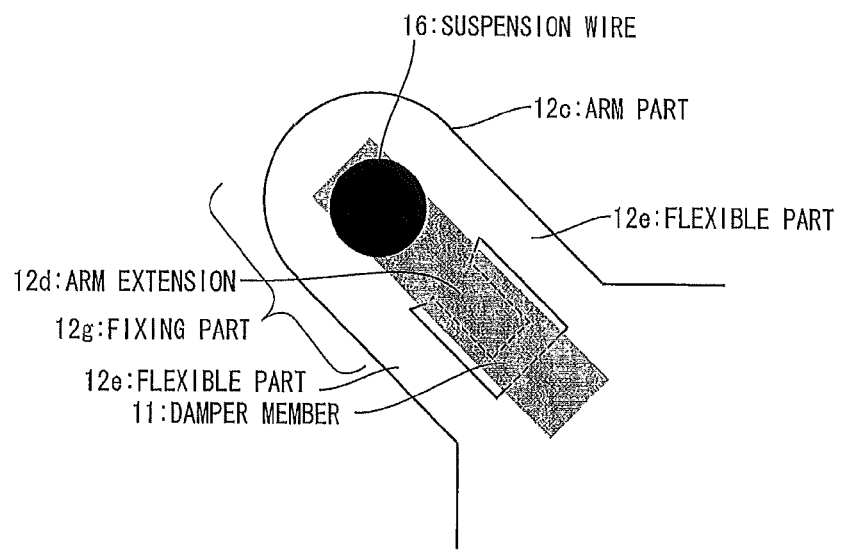
FIG. 13 is a view schematically illustrating an example of how an elastic member/damper member is provided in Embodiment 3 of the present invention.

FIG. 13 illustrates a modification of how the arm part 12c is to be configured and how the damper member 11 is to be provided. FIG. 13 is a cross-sectional view taken along the line D-D drawn in (b) of FIG. 12. In the modification illustrated in FIG. 13, (i) an arm extension 12d extends out from an end-part side to a root-part side of an arm part 12c and (ii) a damper member 11 is provided to serve as a bridge between the arm extension 12d and a root part of the arm part 12c, which root part is on an intermediate-supporting-member-13 side. The damper member 11 is provided so as to cover part of a flexible part 16c of a suspension wire 16. Specifically, the damper member 11 is provided so as to cover at least part of a circumference of an end part of the flexible part 16c, which end part is on an arm-part-12c side. This configuration allows for (A) damping of the oscillations of the arm parts 12c and (B) a damping effect for preventing the breakdown of the suspension wire 16. In other words, it is possible, with the configuration, to suitably suppress the oscillation of the arm parts 12c as well as the oscillation of the root part of the flexible part 16c.

Figure 14:
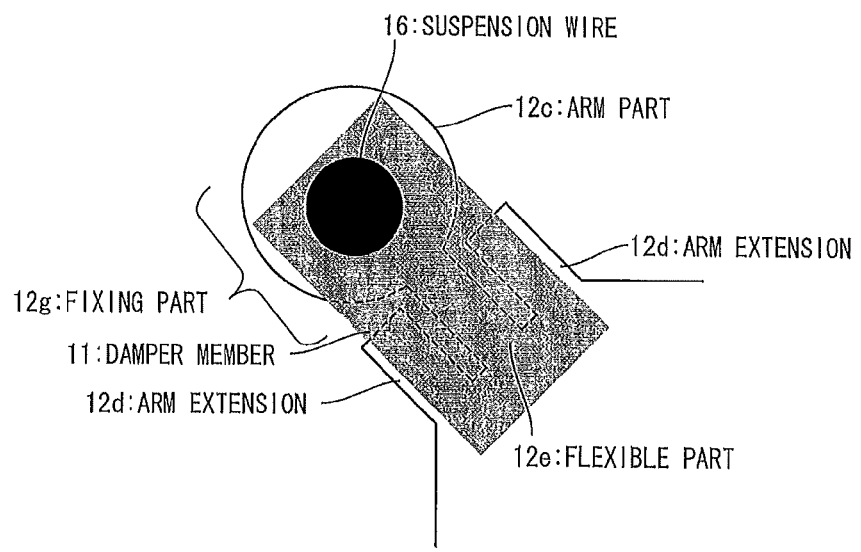
FIG. 14 is a view schematically illustrating another example of how the elastic member/damper member is provided in Embodiment 3 of the present invention.

FIG. 14 illustrates another modification of how the arm part 12c is to be configured and how the damper member 11 is to be provided. FIG. 14 is a cross-sectional view taken along the line D-D drawn in (b) of FIG. 12. In the modification illustrated in FIG. 14, (i) an arm extension 12d extends out from an intermediate-supporting-member-13 side of an arm part 12c and (ii) a damper member 11 is provided to serve as a bridge between the arm extension 12d and an end-part side of the arm parts 12c. The damper member 11 is provided so as to cover part of a flexible part 16c of a suspension wire 16. This configuration allows for (A) damping of the oscillations of the arm parts 12c and (B) a damping effect for preventing the breakdown of the suspension wire 16.

Figure 15:
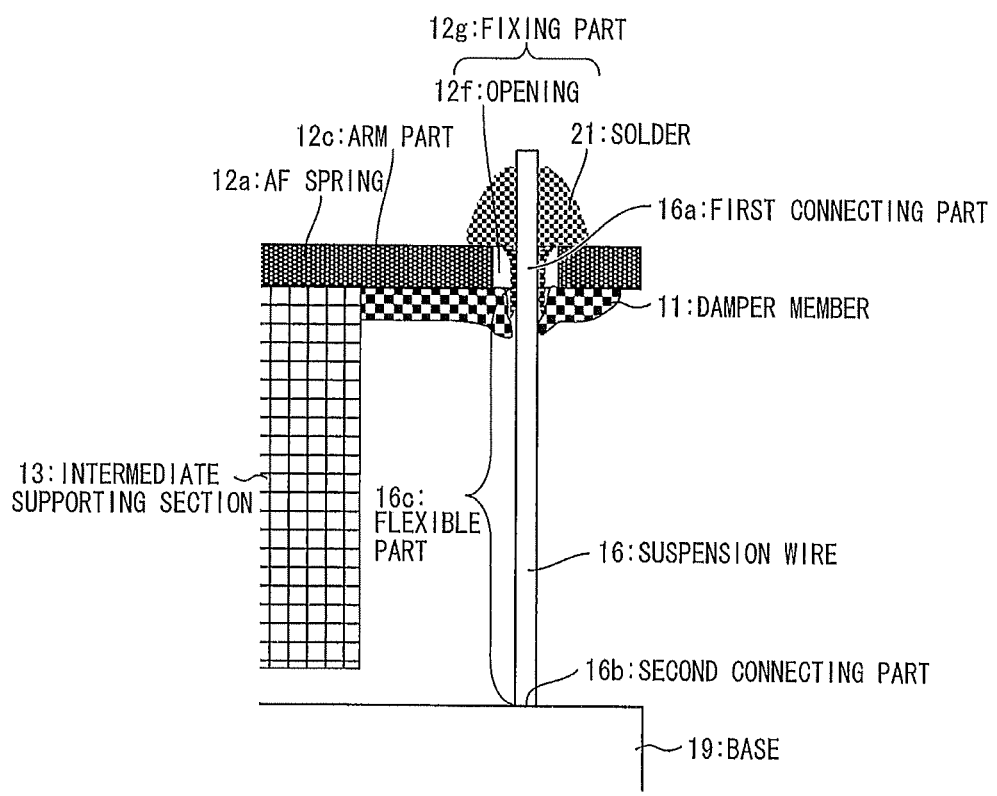
FIG. 15 is a view illustrating another modification of how the damper member is provided according to Embodiment 3 of the present invention.

FIG. 15 illustrates a further modification in which (i) a damping effect with respect to an arm part 12c is brought about and (ii) an effect of preventing breakdown of the suspension wire 16 is brought about. FIG. 15 is a cross-sectional view taken along the line C-C drawn in FIG. 3. According to the modification illustrated in FIG. 15, (A) a damper member 11 is provided so as to cover an end part of a flexible part 16c of a suspension wire 16 and (B) one end of the damper member 11 is connected to an intermediate supporting member 13. Note that the intermediate supporting member 13 is hardly displaced in the optical-axis direction during vibrations of the arm part 12c. Accordingly, when a fixing part 12g (to which the suspension wire 16 is fixed) of an arm parts 12 is displaced in the optical-axis direction, the damper member 11 acts to suppress a relative displacement rate between the fixing part 12g and the intermediate supporting member 13. As such, the damper member 11 can bring about a damping effect with respect to the arm part 12c. Furthermore, since the damper member 11 cover the end part of the flexible part 16c, it is possible to obtain an effect of preventing breakdown of the suspension wire 16.

Figure 16:
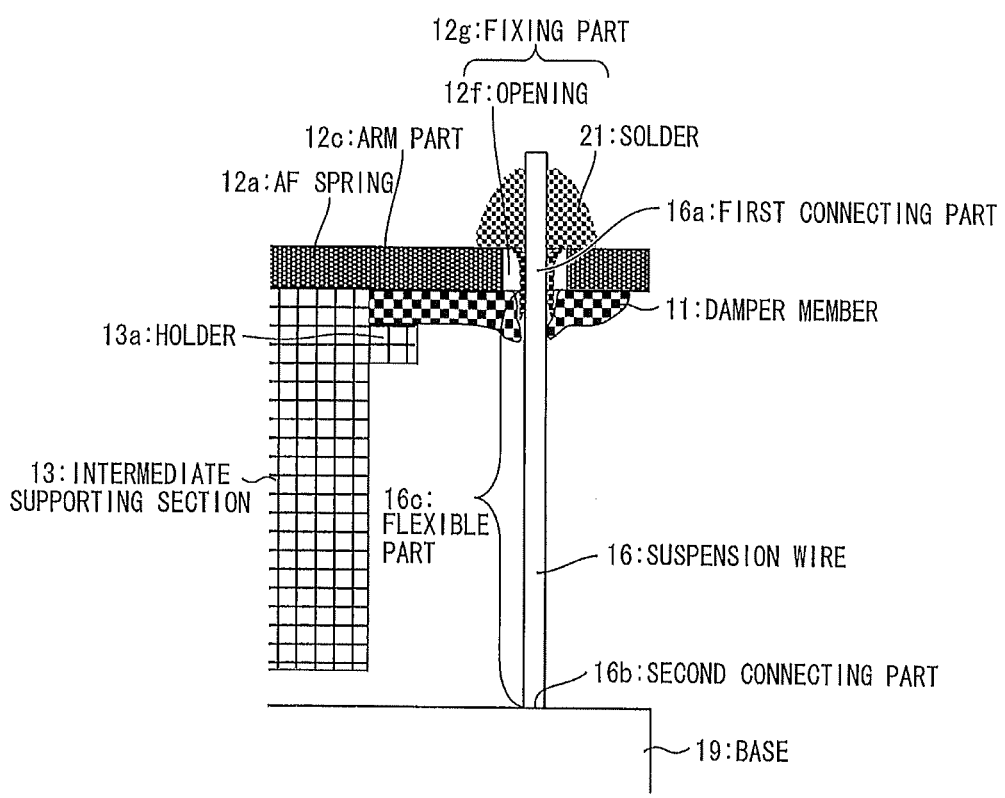
FIG. 16 is a view illustrating a further modification of how the damper member is provided according to Embodiment 3 of the present invention.

Note that, although FIG. 15 appears as if the damper member 11 is assumed to be made of a gel, the damper member 11 is not limited to such. For example, the damper member 11 can be a sheet-like damper member. Also note that the damper member 11 and the intermediate supporting member 13 are preferably connected to each other with a certain degree of strength, rather than simply in contact with each other. For example, a fillet can be provided at a corner part. It is also preferable that a configuration where a region of the intermediate supporting member 13, in which region the intermediate supporting member 13 is contact with the damper member 11, is optimized as needed so that a gel is applied or a sheet-like damper member is provided, with ease. Moreover, in the case where a gel is used as the damper member 11, it is preferable to provide, on the intermediate supporting member 13, a holder 13a (e.g. a step) for facilitating the application of the damper member 11 (see FIG. 16).

The description has discussed the case where the suspension wire 16 is fixed to the arm part 12c with the use of the solder 21. Embodiment 3 is, however, not limited to such. It is possible to provide a damper member 11 (i) on a bottom surface (facing a flexible part 16c) of an arm part 12c and (ii) so as to cover at least part of an end part (on an arm-part-12c side) of a flexible part 16c. With the configuration, the damper member 11 suppresses vibrations of a root part of the flexible part 16c. This causes alleviation of the stress to be applied to the root part. It is therefore possible to prevent its breakdown even when the stress is repeatedly applied to the suspension wires 16, regardless of whether or not solders are used.

In addition, although the description has discussed the case where the damper member 11 is applied to the arm part 12c. Embodiment 3 is, however, not limited to such. That is, it is possible to obtain the same advantageous effect by configuring a camera module 50 in accordance with Embodiment 2 as follows: provide the damper member 11 (i) on a top surface (facing a flexible part 16c) of a substrate part 19b and (ii) so as to cover at least part of an end part (on a substrate-part-19b side) of the flexible part 16c. In other words, with the configuration, the damper member 11 suppresses vibrations of a root part of the flexible part 16c. This causes alleviation of the stress to be applied to the root part. It is therefore possible to prevent its breakdown even when the stress is repeatedly applied to the suspension wires 16.

The present invention is not limited to the embodiments, but can be altered in many ways by a person skilled in the art within the scope of the claims. An embodiment derived from a proper combination of technical means disclosed in different embodiments is also encompassed in the technical scope of the present invention.

SUMMARY

The camera module in accordance with the present invention is a camera module having a function of compensating for hand shake, including: a moving part including image capturing lenses; a fixed part surrounding the moving part; a driving means for moving the moving part in a direction perpendicular to a direction of an optical axis of the image capturing lenses; suspension wires, which extend parallel to or at an angle to the direction of the optical axis, for supporting the moving part such that the moving part is moved in the direction perpendicular to the optical axis; elastic members, connected to at least one ends of the respective suspension wires, each suppressing stress to be applied to a corresponding one of the suspension wires; and damper members, applied to the respective elastic members, which cause a reduction in vibrations of the elastic members.

According to the configuration, as described above, there is a possibility that, when the driving means servo drives the moving part for compensating for hand shake, a rotational moment is applied to the moving part so that the elastic members connected to the suspension wires resonate. In such a case, the resonance of the elastic members might adversely affect the servo driving for compensation for hand shake. However, with the configuration, the damper members are applied to the elastic members. This causes a reduction in the resonance of the elastic members. Therefore, with the configuration, it is possible to reduce the risk of the oscillation of the servo system while ensuring drop-impact resistance.

It is preferable to arrange the camera module in accordance with the present invention to further include: a locking member for controlling a moving range in which the moving part is moved in the direction of the optical axis, the suspension wires and the elastic members each having a spring constant which is set such that buckling stress of each suspension wire remains greater than a maximum value of stress which varies depending on an amount of a deformation, in a longitudinal direction, of the each suspension wire, which deformation occurs when the moving part is moved within the moving range.

With the configuration, it is possible to successfully prevent buckling of the suspension wires, which buckling is caused by a drop impact or the like. Thus, with the configuration, it is possible to reduce the risk of the oscillation of the servo system while ensuring a drop-impact resistance.

Note that, even in a case where an elastic material that becomes deformed with the force smaller than a buckling load of a wire is used as a buckling prevention member (see Patent Literature 2), it can be difficult to successfully prevent the buckling and permanent strain of suspension wires caused by a drop impact or the like. This is because (i) an elastic material, in essence, becomes deformed when receiving physical force (i.e. Hooke's law is thus applied in an elastic range) and (ii) the suspension wires therefore become deformed and then, depending on the amount of the deformation, the buckling or permanent strain might occur, even if the buckling prevention member disclosed in Patent Literature 2 is used. Hence, in order to successfully prevent the buckling and permanent strain of the suspension wires caused by a drop impact or the like, it is necessary, as shown in the configuration, to arrange the spring constant of the suspension wires and of the elastic members so as to reduce the amount of the deformations of the suspension wires.

In addition, it is preferable to set the spring constant of the elastic members to be sufficiently smaller than the spring constant of the suspension wires. In the case where the spring constant of the elastic members is set to be thus small, the resonant frequency of the elastic members become lowered (as compared with the case of Patent Literature 2), and the risk of the oscillation of the servo system therefore becomes higher. However, the camera module in accordance with the present invention can suitably reduce such a risk by use of damper members.

The camera module in accordance with the present invention can be arranged such that: the moving part includes flat springs for supporting the image capturing lenses; and the elastic members are extending parts of the respective flat springs, which extending parts each extend out toward the fixed part.

According to the configuration, (i) the suspension wires are fixed to the respective extending parts of the flat springs included in the moving part and (ii) the extending parts function as elastic members that suppress the buckling and permanent strain of the suspension wires. This means that, with the configuration, it is possible to suitably configure a camera module equipped with a mechanism of compensating for hand shake, which mechanism includes suspension wires connected to elastic members.

It is preferable to arrange the camera module such that the damper members are provided so as to cover at least part of the respective extending parts.

With the configuration, since the damper members are provided so as to cover the extending parts, it is possible to suitably take advantage of the damper members.

It is preferable to arrange the camera module such that each of the damper members is provided to serve as a bridge between (i) a fixing part of a corresponding one of the extending parts, to which fixing part a corresponding one of the suspension wires is fixed and (ii) a part having a less amount of displacement that occurs in the direction of the optical axis during vibrations of a corresponding one of the elastic members than an amount of displacement of a corresponding one of the fixing parts.

According to the configuration, each of the damper members, while the elastic members are vibrating, serves as bridges between (i) a fixing part whose amount of displacement in the optical-axis direction is large and (ii) a part whose amount of displacement in the optical-axis is small. This makes it possible to (A) suppress the difference in the displacement rate between the respective parts and therefore (B) suitably suppress the vibrations of the elastic members (a damping effect is achieved).

The camera module can be arranged such that: each extending part has an arm extension which protrudes from a corresponding one of the fixing parts toward a root part of the each extending part; and each of the damper members is provided to serve as a bridge between the arm extension and the root part.

According to the configuration, each of the damper members serves as a bridge between (i) each arm extension extending from the fixing part to which each suspension wire is connected and (ii) the root part of each extending part. This makes it possible to suppress the difference between the displacement rate of the arm extension and the displacement rate of the root part, which difference occurs during the vibration of each extending part. Therefore, it is possible to effectively suppress the vibration of the elastic members even if the damper members are provided locally.

The camera module can be arranged such that: each extending part includes an arm extension which protrudes from a root part of a corresponding one of the extending parts toward a corresponding one of the fixing parts; and each of the damper members is provided to serve as a bridge between the arm extension and the root part.

According to the configuration, each of the damper members serves as a bridge between (i) the arm extension extending from the root part of each extending part and (ii) the fixing part to which each suspension wire is fixed. This makes it possible to suppress the difference between the displacement rate of the arm extension and the displacement rate of the fixing part, which difference occurs during the vibration of each extending part. Therefore, it is possible to effectively suppress the vibration of the elastic members even if the damper members are provided locally.

The camera module in accordance with the present invention can be arranged such that: the moving part has a supporting member for supporting the flat springs; and each of the damper members is provided to serve as a bridge between a corresponding one of the fixing parts and the supporting member.

According to the configuration, each of the damper members serves as a bridge between (i) each fixing part whose amount of deformations in the optical-axis direction is large and (ii) the supporting member that hardly becomes deformed in the optical-axis direction. This makes it possible to suppress the difference between the displacement rates of the fixing parts and the displacement rate of the supporting member, which difference occurs during the vibration of the elastic members. Therefore, it is possible to suitably suppress the vibrations of the elastic members (a damping effect is achieved).

The camera module in accordance with the present invention can be arranged such that: the fixed part includes a substrate having flexible parts; and the elastic members are the respective flexible parts.

According to the configuration, (i) the suspension wires are fixed to the respective flexible parts of the substrate included in the fixed part and (ii) the flexible parts function as elastic members for suppressing the buckling and permanent strain of the suspension wires. This means that, with the configuration, it is possible to suitably configure a camera module equipped with a mechanism for compensating for hand shake, which mechanism includes suspension wires connected to elastic members.

It is preferable to arrange the camera module in accordance with the present invention such that each of the damper members is an ultraviolet-curing gel.

With the configuration, it is possible to (i) easily provide the damper members by applying a damper gel to desired locations and (ii) prevent, as a result of the damper members being provided, an increase of the spring constant of the elastic members. This makes it possible to suitably reduce the risk of the oscillation of the servo system.

It is preferable to arrange the camera module in accordance with the present invention such that: each of the suspension wires is made up of: a first connecting part connected to the moving part, a second connecting part connected to the fixed part, and a flexible part sandwiched between the first connecting part and the second connecting part; and each of the damper members (i) is provided on a surface of a corresponding one of the elastic members, which surface faces the flexible part and (ii) covers at least part of an end part of the flexible part, which end part is on a side where the corresponding one of the elastic members is provided.

According to the configuration, each damper member covers at least part of the end part of each flexible part, which end part is on the side where the elastic member is provided. This makes it possible to suppress (i) the vibrations of the elastic members and (ii) the vibrations of the suspension wires, which vibrations occur at areas around the respective end parts. Therefore, it is possible to lessen the stress to be applied to the suspension wires and therefore to prevent the breakages of the suspension wires.

It is preferable to arrange the camera module in accordance with the present invention such that the suspension wires are fixed to the respective elastic members by use of solders.

With the configuration, it is possible to fix the suspension wires tightly to the respective elastic members. Moreover, each damper member covers at least part of the end part of each flexible part, which end part is on the side where the elastic member is provided. Therefore, even in a case where each suspension wire to be a flexible part is soldered to each elastic member, it is possible to (i) lessen the stress to be applied to the suspension wires and therefore (ii) prevent the breakages of the suspension wires.

INDUSTRIAL APPLICABILITY

The present invention can be used in the field of camera module production, and, especially, in the field of producing camera modules to be mounted on various electronic devices including communication tools such as mobile devices.

REFERENCE SIGNS LIST

1 Image capturing lens
2 Lens barrel
3, 20 Adhesive
4 Lens holder
5 Lens drive section
6 Image capturing element
7 Substrate
8 Sensor cover
9 Glass substrate
10 Image capturing section 10
11 Damper member
12a, 12b AF spring (flat spring)
12c Arm part (extending part, elastic member)
12d Arm extension
12e Flexible part
12f Opening
12g Fixing part
13 Intermediate supporting member (supporting member)
13a Holder
14 AF coil
15 Permanent magnet
16 Suspension wire
16a First connecting part
16b Second connecting part
16c Flexible part
17 Cover
18 OIS coil (driving means)
19 Base
19a Resin part
19b Substrate part (elastic member)
21 Solder
50 Camera Module

The invention claimed is:

1. A camera module having a function of compensating for hand shake, comprising:
   a moving part including image capturing lenses;
   a fixed part surrounding the moving part;
   a driving means for moving the moving part in a direction perpendicular to a direction of an optical axis of the image capturing lenses;
   suspension wires, which extend parallel to or at an angle to the direction of the optical axis, for supporting the moving part such that the moving part is moved in the direction perpendicular to the optical axis;
   elastic members, connected to at least one ends of the respective suspension wires, each suppressing stress to be applied to a corresponding one of the suspension wires; and
   damper members, applied to the respective elastic members, which cause a reduction in vibrations of the elastic members,
   wherein:
   the moving part includes flat springs for supporting the image capturing lenses; and
   the elastic members are extending parts of the respective flat springs, which extending parts each extend out toward the fixed part.

2. A camera module as set forth in claim 1, further comprising:
   a locking member for controlling a moving range in which the moving part is moved in the direction of the optical axis,
   the suspension wires and the elastic members each having a spring constant which is set such that buckling stress of each suspension wire remains greater than a maximum value of stress which varies depending on an amount of a deformation, in a longitudinal direction, of the each suspension wire, which deformation occurs when the moving part is moved within the moving range.

3. The camera module as set forth in claim 1, wherein the damper members are provided so as to cover at least part of the respective extending parts.

4. The camera module as set forth in claim 3, wherein each of the damper members is provided to serve as a bridge between (i) a fixing part of a corresponding one of the extending parts, to which fixing part a corresponding one of the suspension wires is fixed and (ii) a part having a less amount of displacement that occurs in the direction of the optical axis during vibrations of a corresponding one of the elastic members than an amount of displacement of a corresponding one of the fixing parts.

5. The camera module as set forth in claim 4, wherein:
each extending part has an arm extension which protrudes from a corresponding one of the fixing parts toward a root part of the each extending part; and
each of the damper members is provided to serve as a bridge between the arm extension and the root part.

6. The camera module as set forth in claim 4, wherein:
each extending part includes an arm extension which protrudes from a root part of a corresponding one of the extending parts toward a corresponding one of the fixing parts; and
each of the damper members is provided to serve as a bridge between the arm extension and the root part.

7. The camera module as set forth in claim 4, wherein:
the moving part has a supporting member for supporting the flat springs; and
each of the damper members is provided to serve as a bridge between a corresponding one of the fixing parts and the supporting member.

8. The camera module as set forth in claim 1, wherein:
the fixed part includes a substrate having flexible parts; and
the elastic members are the respective flexible parts.

9. The camera module as set forth in claim 1, wherein each of the damper members is an ultraviolet-curing gel.

10. The camera module as set forth in claim 1, wherein:
each of the suspension wires is made up of:
a first connecting part connected to the moving part,
a second connecting part connected to the fixed part, and
a flexible part sandwiched between the first connecting part and the second connecting part; and
each of the damper members (i) is provided on a surface of a corresponding one of the elastic members, which surface faces the flexible part and (ii) covers at least part of an end part of the flexible part, which end part is on a side where the corresponding one of the elastic members is provided.

11. The camera module as set forth in claim 9, wherein the suspension wires are fixed to the respective elastic members by use of solders.

12. A camera module having a function of compensating for hand shake, comprising:
a moving part including image capturing lenses;
a fixed part surrounding the moving part;
a driving means for moving the moving part in a direction perpendicular to a direction of an optical axis of the image capturing lenses;
suspension wires, which extend parallel to or at an angle to the direction of the optical axis, for supporting the moving part such that the moving part is moved in the direction perpendicular to the optical axis;
elastic members, connected to at least one ends of the respective suspension wires, each suppressing stress to be applied to a corresponding one of the suspension wires; and
damper members, applied to the respective elastic members, which cause a reduction in vibrations of the elastic members,
wherein:
each of the suspension wires is made up of:
a first connecting part connected to the moving part,
a second connecting part connected to the fixed part, and
a flexible part sandwiched between the first connecting part and the second connecting part; and
each of the damper members (i) is provided on a surface of a corresponding one of the elastic members, which surface faces the flexible part and (ii) covers at least part of an end part of the flexible part, which end part is on a side where the corresponding one of the elastic members is provided.

13. A camera module as set forth in claim 12, further comprising:
a locking member for controlling a moving range in which the moving part is moved in the direction of the optical axis,
the suspension wires and the elastic members each having a spring constant which is set such that buckling stress of each suspension wire remains greater than a maximum value of stress which varies depending on an amount of a deformation, in a longitudinal direction, of the each suspension wire, which deformation occurs when the moving part is moved within the moving range.

14. The camera module as set forth in claim 12, wherein:
the moving part includes flat springs for supporting the image capturing lenses;
the elastic members are extending parts of the respective flat springs, which extending parts each extend out toward the fixed part; and
the damper members are provided so as to cover at least part of the respective extending parts.

15. The camera module as set forth in claim 14, wherein each of the damper members is provided to serve as a bridge between (i) a fixing part of a corresponding one of the extending parts, to which fixing part a corresponding one of the suspension wires is fixed and (ii) a part having a less amount of displacement that occurs in the direction of the optical axis during vibrations of a corresponding one of the elastic members than an amount of displacement of a corresponding one of the fixing parts.

16. The camera module as set forth in claim 15, wherein:
each extending part has an arm extension which protrudes from a corresponding one of the fixing parts toward a root part of the each extending part; and
each of the damper members is provided to serve as a bridge between the arm extension and the root part.

17. The camera module as set forth in claim 15, wherein:
each extending part includes an arm extension which protrudes from a root part of a corresponding one of the extending parts toward a corresponding one of the fixing parts; and
each of the damper members is provided to serve as a bridge between the arm extension and the root part.

18. The camera module as set forth in claim 15, wherein:
the moving part has a supporting member for supporting the flat springs; and
each of the damper members is provided to serve as a bridge between a corresponding one of the fixing parts and the supporting member.

19. The camera module as set forth in claim 12, wherein:
the fixed part includes a substrate having flexible parts; and
the elastic members are the respective flexible parts.

20. The camera module as set forth in claim 12, wherein each of the damper members is an ultraviolet-curing gel.

21. The camera module as set forth in claim 20, wherein the suspension wires are fixed to the respective elastic members by use of solders.

* * * * *